US009872360B2

(12) United States Patent
Xu et al.

(10) Patent No.: US 9,872,360 B2
(45) Date of Patent: Jan. 16, 2018

(54) PHOTOCONTROL WITH SURGE PROTECTING FUNCTION

(71) Applicant: XIAMEN SET ELECTRONICS CO., LTD, Xiamen (CN)

(72) Inventors: Zhonghou Xu, Xiamen (CN); Hanping Zhang, Xiamen (CN); Xianggui Zhang, Xiamen (CN); Chengxian Xu, Xiamen (CN)

(73) Assignee: XIAMEN SET ELECTRONICS CO., LTD, Xiamen (CN)

( * ) Notice: Subject to any disclaimer, the term of this patent is extended or adjusted under 35 U.S.C. 154(b) by 0 days.

(21) Appl. No.: 15/117,456

(22) PCT Filed: Feb. 4, 2015

(86) PCT No.: PCT/CN2015/072238
§ 371 (c)(1),
(2) Date: Aug. 9, 2016

(87) PCT Pub. No.: WO2015/149585
PCT Pub. Date: Oct. 8, 2015

(65) Prior Publication Data
US 2016/0353545 A1   Dec. 1, 2016

(30) Foreign Application Priority Data
Mar. 31, 2014   (CN) ..................... 2014 2 0150952 U

(51) Int. Cl.
*H05B 33/08*   (2006.01)
*H05B 37/03*   (2006.01)
(Continued)

(52) U.S. Cl.
CPC ....... *H05B 33/0884* (2013.01); *F21V 23/009* (2013.01); *F21V 23/06* (2013.01);
(Continued)

(58) Field of Classification Search
CPC .............. H05B 33/0887; H05B 41/285; H05B 41/292; H05B 41/298; H05B 33/0884;
(Continued)

(56) References Cited

U.S. PATENT DOCUMENTS 5,895,986 A *   4/1999  Walters .............. H05B 37/0218
                                                250/214 AL
8,284,536 B2   10/2012  Minarczyk et al.
(Continued)

FOREIGN PATENT DOCUMENTS

CN   200976331 Y   11/2007
CN   201008071 Y   1/2008
(Continued)

OTHER PUBLICATIONS

Littlelfuse (Designing with Thermally Protected TMOV® Varistors)—May 31, 2011.*

*Primary Examiner* — Alexander H Taningco
*Assistant Examiner* — Renan Luque
(74) *Attorney, Agent, or Firm* — Gokalp Bayramoglu

(57) ABSTRACT

An photocontroller with surge protecting function includes an photocontroller unit, a surge protection unit, and an photocontroller base. On the basis of an existing photocontroller unit and an existing photocontroller base, the surge protection unit is integrated inside the photocontroller unit or the surge protection unit can be connected in a plug-in manner. The surge protection unit is connected in parallel to a power supply phase line terminal and a neutral line terminal of the photocontroller unit. A ground line terminal of the surge protection unit is connected, by means of a ground connector, to the conductive part disposed on the photocontroller base. The conductive piece is grounded. The photocontroller and the surge protection function are combined, which can effectively discharge a surge current, (Continued)

suppress a surge voltage, is easy to mount and replace, and can reduce post-maintenance cost.

2 Claims, 12 Drawing Sheets

(51) Int. Cl.
| | | |
|---|---|---|
| *F21V 23/00* | (2015.01) | |
| *H05B 37/02* | (2006.01) | |
| *F21V 23/06* | (2006.01) | |
| *H01H 36/00* | (2006.01) | |
| *F21Y 115/10* | (2016.01) | |
| *F21W 131/103* | (2006.01) | |

(52) U.S. Cl.
CPC ......... *H01H 36/00* (2013.01); *H05B 33/0887* (2013.01); *H05B 37/0218* (2013.01); *H05B 37/03* (2013.01); *F21W 2131/103* (2013.01); *F21Y 2115/10* (2016.08); *Y02B 20/341* (2013.01); *Y02B 20/46* (2013.01)

(58) Field of Classification Search
CPC ................ H05B 33/083; H05B 33/089; H05B 37/0218; H05B 37/0254; H05B 37/0227; H05B 33/0854; H05B 37/0272; H05B 33/0842; Y02B 20/208; Y02B 20/341; Y02B 20/46; F21V 29/70; F21V 23/003; F21V 23/007; H01L 33/642; H01L 33/62; H01L 33/54; H01L 25/0753; H01L 33/486; H01L 2224/48247; H01L 2924/181; H01L 2924/00012; F21Y 2103/10; F21Y 2101/00; F21Y 2103/003; F21Y 2101/02

USPC ......... 250/214 LS, 214 AL, 214 D, 214 SG, 250/214 C, 214 RC, 214 SW, 214 R; 327/514, 517, 519, 520, 121; 315/127, 315/134–136

See application file for complete search history.

(56) References Cited

U.S. PATENT DOCUMENTS

| | | | | |
|---|---|---|---|---|
| 2005/0180080 A1* | 8/2005 | Harris | ............... | H02H 9/042 361/111 |
| 2014/0168833 A1* | 6/2014 | Sesink | ............... | H02H 9/042 361/56 |
| 2015/0115807 A1* | 4/2015 | Schroder | ............ | H05B 37/0218 315/158 |

FOREIGN PATENT DOCUMENTS

| | | |
|---|---|---|
| CN | 101871578 A | 10/2010 |
| CN | 202616768 U | 12/2012 |
| CN | 203761658 U | 6/2014 |

* cited by examiner

PHOTOCONTROL WITH SURGE PROTECTING FUNCTION

TECHNICAL FIELD

The application relates to a photocontrol, more particularly to a photocontrol with a surge protecting function.

BACKGROUND

In recent years, with the rapid development of global economy, there is a significant increase in energy demand, causing an increasingly prominent contradiction between energy supply and demand. Therefore, energy saving is becoming more and more important. Nowadays, domestic control and operating methods of road lighting are the dedicated control line, the control line with a load, the timing control, and other control methods. However, most of the traditional control methods of road lighting focus on control or timing control. This results in loss of energy. Photo control is a well-known method used for energy saving. The principle of photo control is that, based on changes of the photosensitive component with respect to changes of the intensity of the light source, the on/off of the lighting power supply is controlled, so as to achieve the most efficient energy control of the lighting power supply. Also, the photocontrol is mounted outside the road lamp, using a quick plug installation, which enables the operation without cutting off the electricity. It only needs one person to install or replace, and only a few minutes to complete, lowering the maintenance costs greatly.

With LED (Light-Emitting Diode) road lighting being widely used, the photocontrol and LED lighting are the two engines of the road lighting system for saving energy and reducing energy consumption. The photocontrol is on the top end of the lighting, and on the front end of a driving power, which has the characteristic of easy and quick replacement. Since the LED road lighting and the photocontrol are particularly sensitive to overvoltage and surge current, without reliable protection measures, an entire road lighting system can be paralyzed by the thunderstorm or thunder overvoltage, which brings significant economic losses and potential safety risk. Thus, the surge protection device has become the necessary device for the photocontrol, LED driving device, and LED Light anti-surge.

When the surge protection device performs the security responsibilities to protect the photocontrol. LED driving device, and LED Light, under a long-time surge attacks, it is likely to be damaged and needs to be replaced frequently. At present, most of the surge protection device of the LED road lighting is mounted inside the lamp, while the LED road lighting is usually mounted on the upper end of the light pole which has a height of 5-10 m. Therefore, the installation and replacement of the surge protection unit require the use of lift trucks to perform elevated work. Moreover, the replacement of the surge protection device can only be performed in a power-cut status, which takes as long as one hour. Thus, the cost of installation and maintenance is high, and operational safety of staff responsible for installation and maintenance is low.

SUMMARY OF THE INVENTION

One of the purposes of the application is to solve problems faced by the prior art by providing a device combining the photocontrol with the surge protection device, allowing management of lighting energy consumption and also thunder and surge protection function. At the same time, the difficulty of the high cost of installation and maintenance of the surge protection device is solved, contributing to the energy saving and reducing consumption of photo control lighting, and improving the lifetime and safety of the lighting system. In particular, the complexity and danger of security maintenance are greatly reduced, thereby improving the safety of maintenance staff.

The application provides a photocontrol with surge protection. In one implementation, a photocontrol includes a photocontrol unit, a surge protection unit, and a photocontrol base. The photocontrol unit includes a shell, an photocontrol circuit, a bottom cap, and a plug. The shell is disposed over the bottom cap. The photocontrol circuit is disposed between the shell and the bottom cap. The first plug is mounted below the bottom cap. The output terminal of the photocontrol circuit is electrically connected to the first plug. The surge protection includes a hermetic chamber. A surge protection circuit is disposed inside the hermetic chamber. The surge protection circuit includes at least one protection component. The surge protection unit is designed as differential mode, common mode, or all-mode scheme according to the different number of protection components.

There are four methods to manufacture each protection component, namely, using the MOV alone; using a current fuse and a MOV in series; using a thermal protection device and a MOV in series; and using a current fuse, a thermal protection device, and a MOV in series. The security of the four methods progressively increases from low, fair, good, to excellent. This application preferentially uses the third method to manufacture the surge protection component. If necessary, common mode surge protection component is connected to a gas discharge tube in series, isolating the leakage current to the ground. The photocontrol base is provided with the socket corresponding to the plug. The surge protection unit is connected in parallel to a power supply phase line (Lin) terminal and neutral line (N) terminal of the photocontrol unit. The ground line (PE) terminal of the surge protection unit is connected to a conductive part on the photocontrol base by at least a ground connector, and the conductive part is connected to the ground.

As a preferable solution, the ground connector includes a lock cover, an elastic member, and a ground connector push rod. A conductive part in the photocontrol base is a mounting screw. The push rod of the ground connector is connected to the head of the mounting nut in a contact manner. When the plug of the photocontrol unit connects to the socket of the photocontrol, the push rod of the ground connector can have a good electrical contact with the mounting nut by the elastic force of the elastic member. Thus, the mounting nut which fixes the photocontrol socket shell is used to connect to the ground line in a pressing manner, so as to connect to the ground to form a surge current discharge path.

In one embodiment, a built-in type structure is disclosed, wherein the surge protection unit is integrated into the photocontrol unit, forming a whole. When being mounted, only the plug of the photocontrol unit is needed to insert into the socket of the photocontrol base. In such built-in type structure, the surge protection unit is added into the existing photocontrol unit. Therefore, the internal photocontrol unit can be divided into two regions. One region is used to provide the surge protection component designed for differential mode and common mode or all-mode scheme of the surge protection unit. The other region is used to provide photocontrol circuit with function of the conventional photocontrol. Specifically, the surge protection unit is provided on PCB (Printed Circuit Board) plate with the photocontrol circuit of the photocontrol unit, sharing the PCB plate with the photocontrol unit. In addition, a ground connector with elasticity is provided on the bottom cap of the photocontrol unit. The location and number of the ground connector correspond to that of the mounting screw which fixes the shell of the photocontrol base. When the plug of the photocontrol unit is inserted into the photocontrol base completely, the elastic force is used to form a good electrical contact with the mounting screw. Inside the photocontrol, the ground connector is connected to the (PE) terminal of surge protection unit to form a surge current discharge path to the ground.

In another embodiment, a transfer type of structure is disclosed. Under the condition that no change is made to the photocontrol unit and the internal structure of the photocontrol socket, the surge protection unit is manufactured as an independent entity, and is provided between the photocontrol unit and the photocontrol base. The independent integrated surge protection unit connects to the photocontrol unit by a connector provided thereon to form a whole. The connector includes a female socket terminal and a male socket terminal. When being installed, the plug of the photocontrol unit is inserted into the female socket terminal of the connector of the surge protection unit, and the male socket terminal of the connector of the surge protection unit is inserted into the socket of the photocontrol base, providing the connector makes the independent integrated surge protection unit have a transfer function. Therefore, the photocontrol unit and the independent integrated surge protection unit are successfully separated in structure, but combined in function. In such a transfer structure, in order to make the independent integrated surge protection unit work properly, a ground connector may be provided to connect to the (PE) terminal of the independent integral surge protection unit to form a surge current discharge path to the ground. Such manner has an advantage of an integrated solution. The independent integrated surge protection unit and the photocontrol unit can be replaced separately and quickly. Thus, the cost of post-maintenance and replacement of device is greatly reduced.

In addition, in the transfer structure of the application, the independent integrated surge protection unit is of a pie-like structure, which includes an upper cover, a lower cover, and a hermetic chamber between the upper and lower covers. The upper cover and lower cover are fixedly connected to form a whole. There are through holes provided on the upper cover for the plug of the photocontrol unit. The connection between the upper and lower covers can be achieved by any manner known by persons skilled in the art, including but not limited to: detachable manners such as projection, grooves provided on the upper and lower covers, or internal, external threads and etc., or non-detachable manners such as bonding, riveting, welding and etc.

Preferably, the connection between the upper and lower covers is achieved by screws and nuts. Specifically, upper center holes are arranged on the upper cover, and lower center holes are arranged on the lower cover. The screw passes through the center hole on the upper cover and the center hole on the lower cover in turn. A water-proof pad is arranged on the bottom of the lower cover, together with a nut for fastening.

Preferably, the surge protection unit includes at least one protection component. Each protection component includes a MOV and at least one thermal protection device that are connected to each other in series. In all-mode protection, a gas discharge tube can be connected to MOV in series, isolating leakage current to the ground.

The thermal protection device can be a mechanical thermal desorption device, thermal fuse, low-melting point alloy disconnect device, bimetal thermal circuit breaker, current fuse, or a combination in series of any number of the above. The thermal protection is achieved by using the over thermal protection feature of the thermal fuse. One embodiment uses "a MOV provided with the alloy type of thermal fuse."

The surge protection circuit of the surge protection unit uses the MOV with thermal protection function. The surge protection circuit specifically includes three protection components. Each protection component includes a MOV and a thermal fuse that are connected with each other in series, and also includes four electrodes and discharge tubes. Wherein, three MOVs are respectively disposed between the first electrode and the second electrode, between the second electrode and the third electrode, and between the third electrode and the fourth electrode. Three thermal fuses are respectively arranged on the first electrode, the second electrode, and the fourth electrode. One terminal of the thermal fuses is electrically connected to the electrode where the thermal fuse is located respectively. Also, the second electrode is electrically connected to the connector of neutral line (N) terminal. The other terminal of the thermal fuse on the third electrode is electrically connected to the connector of incoming line (Lin) terminal. The input electrode connecting line of the discharge tube is respectively electrically connected to the other terminal of the thermal fuse on the first electrode, the other terminal of the thermal fuse on the fourth electrode, and one terminal of the discharge tube. The output electrode connecting line of the discharge tube is electrically connected to the other terminal of the discharge tube and the ground connector push rod.

One of the benefits of the invention is that by providing integrated or transfer type surge protection unit, the photocontrol with photo lighting control has the protection function of surge voltage and surge current at the same time. The elastic ground connector is connected to the mounting screw on the socket of the photocontrol base in a contact way, to form a surge current discharge path to the ground. Providing the plug-in connector achieves an easy installation and replacement of the surge protection unit, as well as separate replacement of the surge protection unit and the photocontrol unit. At the same time, the problem of the difficulty of the installation of the surge protection and high maintenance cost is solved. Thus, the contribution is made to the energy saving and consumption reducing of the photo control lighting, and the lifetime and safety of lighting system are improved. In particular, the complexity and danger of security maintenance are greatly reduced, thus improving the safety of maintenance staff. Different connection modes of the circuit inside the surge protection unit, realities the protection requirements of common mode, differential mode, and all-mode of the LED lighting power supply system.

In one mode the surge protection unit can be built into compact-sized electronic device or in the transfer mode the surge protection unit can be quickly replaced. The invention is not limited to be used in LED street lights and photocontrol products, it can also be used in other compact electrical and electronic equipment, such as a sound controller, a monitor, and so on.

BRIEF DESCRIPTION OF THE DRAWINGS

Referring to the following drawings, further descriptions are made to the application, wherein.

In the text, the same reference numbers denote the same parts. When describing specific drawings, not all the parts or components shown are discussed together with the corresponding figure. Among others, reference numbers are as following.

1 - - - photocontrol unit; 101 - - - shell; 102 - - - PCB plate with photocontrol circuit; 103 - - - electric connector; 104 - - - bottom cap; 105 - - - plug; 105 - - - mounting through hole of ground connector 4;

2A, 2B - - - surge protection unit; 201A, 201B - - - upper cover; 202 - - - lower cover; 203A, 203B - - - first electrode; 204A, 204B - - - three pieces of MOV; 205A, 205B - - - second electrode; 206A, 206B - - - third electrode; 207A, 207B - - - fourth electrode; 208 - - - connector of incoming line terminal L; 208A - - - female socket terminal of connector of incoming line terminal L; 208B - - - male plug terminal of connector of incoming line terminal L; 210A, 210B - - - three thermal protection disconnecting devices (i.e., thermal fuse); 211 - - - connector of load terminal L; 211A - - - female socket terminal of connector of load terminal L; 211B - - - male plug terminal of connector of load terminal L; 212B - - - input electrode connecting line of discharge tube; 213B - - - output electrode connecting line of discharge tube; 214A, 214B - - - discharge tube; 215 - - - connector of neutral line terminal N; 215A - - - female socket terminal of connector of neutral line terminal N; 215B - - - male plug terminal of connector of neutral line terminal N; 216 - - - waterproof pad; 217 - - - screw; 218 - - - nut; 219 - - - mounting through hole; 220 - - - photocontrol socket; 221 - - - center hole of upper cover; 222 - - - center hole of lower cover.

3 - - - photocontrol base; 301 - - - socket; 302 - - - mounting screw; 303 - - - mounting nut; 304 - - - hole;

4 - - - ground connector; 401 - - - lock cover of ground connector; 402 - - - spring; 403 - - - push rod of ground connector.

DETAILED DESCRIPTION

Hereinafter, the application will be described more completely by embodiments accompanied by the drawings, wherein only a few embodiments have been shown. However, in practice, the application can be embodied in many different forms, and should not be limited to the embodiments in the text. These embodiments are provided for the purpose of better understanding of the application.

Figure 1A:
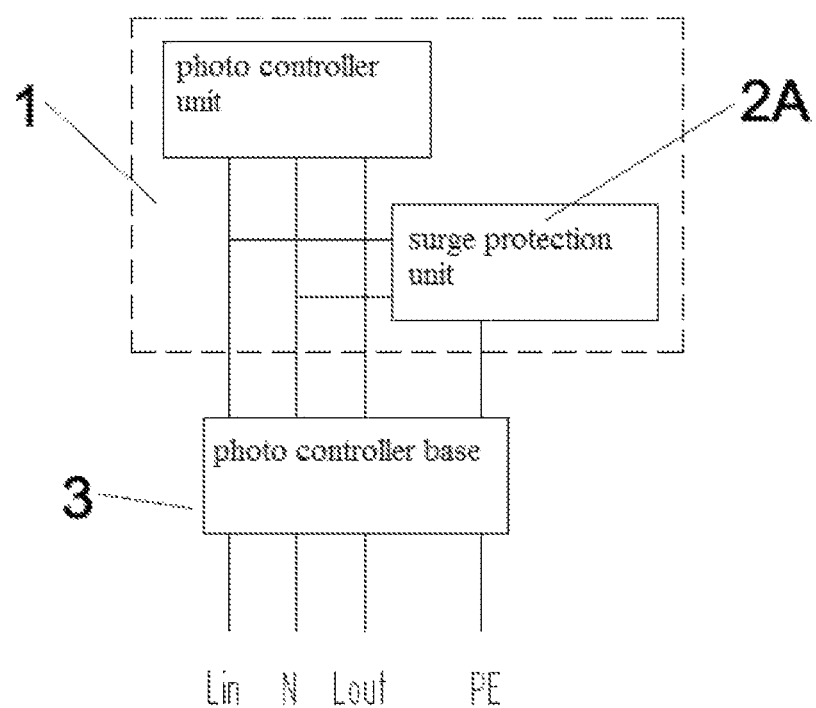
FIG. 1A is a built-in type functional block diagram of the photocontrol with a surge protecting function in Embodiment One.
Figure 1B:
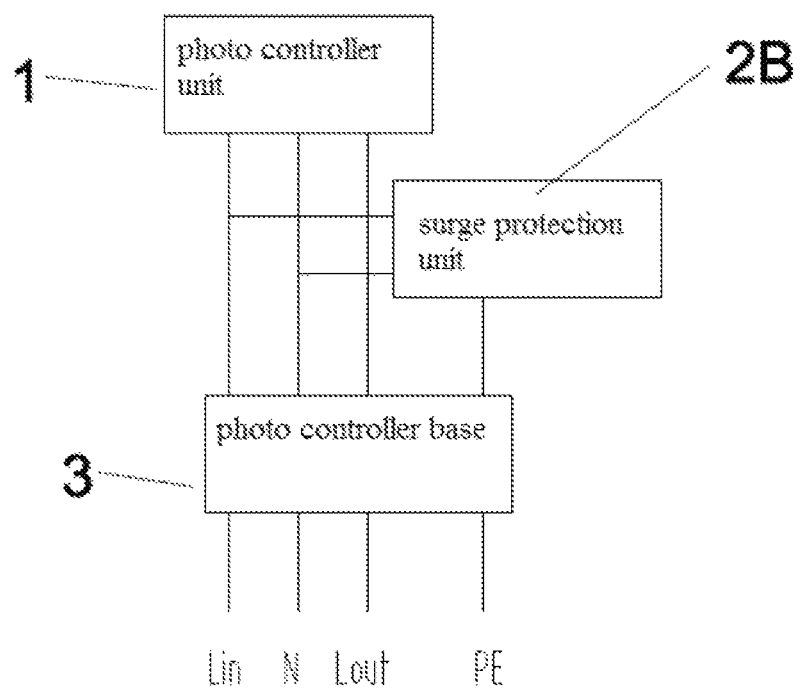
FIG. 1B is a pie-transfer type functional block diagram of the photocontrol with a surge protecting function in Embodiment Two.

FIG. 1A and FIG. 1B are functional block diagrams of the photocontrol with a surge protecting function in Embodiment One and Embodiment Two respectively. It can be used in LED road lighting power. As shown in FIG. 1A and FIG. 1B, the photocontrol of the application includes photocontrol unit 1, surge protection unit 2A, 2B, and photocontrol base 3. The surge protection unit 2A, 2B are connected in parallel to the power supply phase line (Lin) and the neutral line (N) of photocontrol unit 1. The ground line (PE) terminal of surge protection unit 2A, 2B is connected to the conductive part on photocontrol base 3 by ground connector 4. The conductive part is connected to the ground by wires. Therefore, the photocontrol with a surge protection function is formed.

Figure 2A:
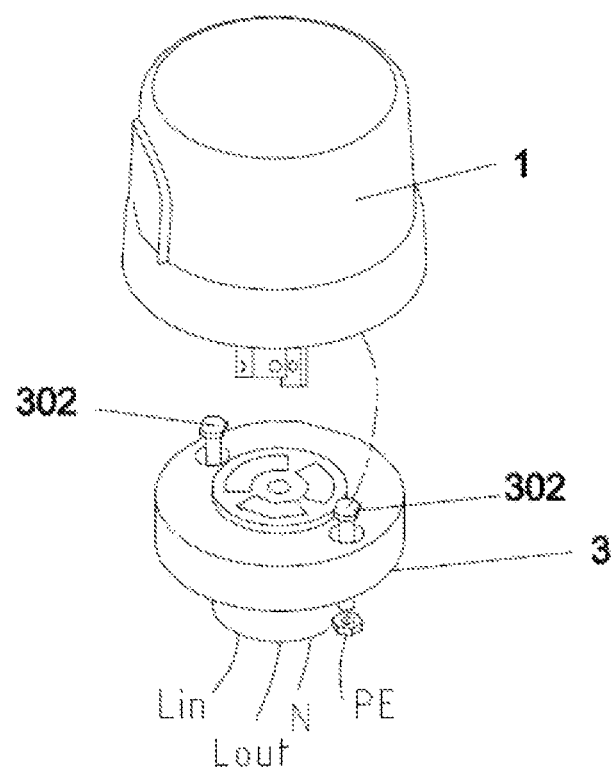
FIG. 2A is a schematic diagram of the appearance of Embodiment One of the application.
Figure 2B:
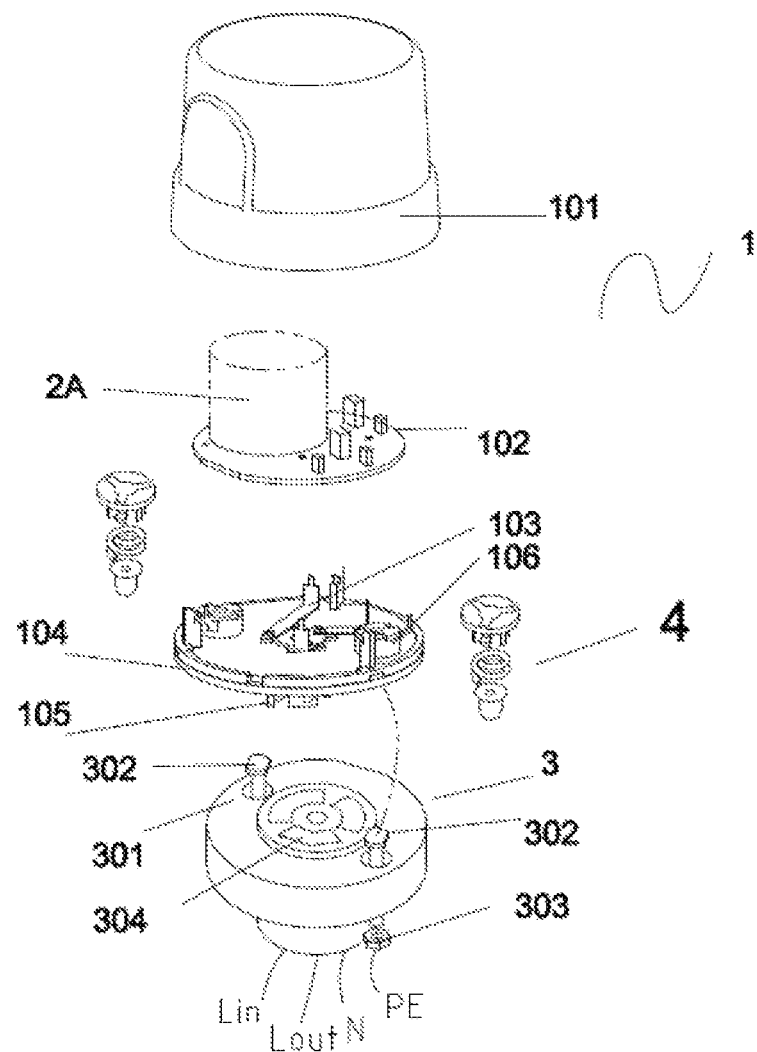
FIG. 2B is a schematic diagram of the structure of Embodiment One of the application.
Figure 2C:
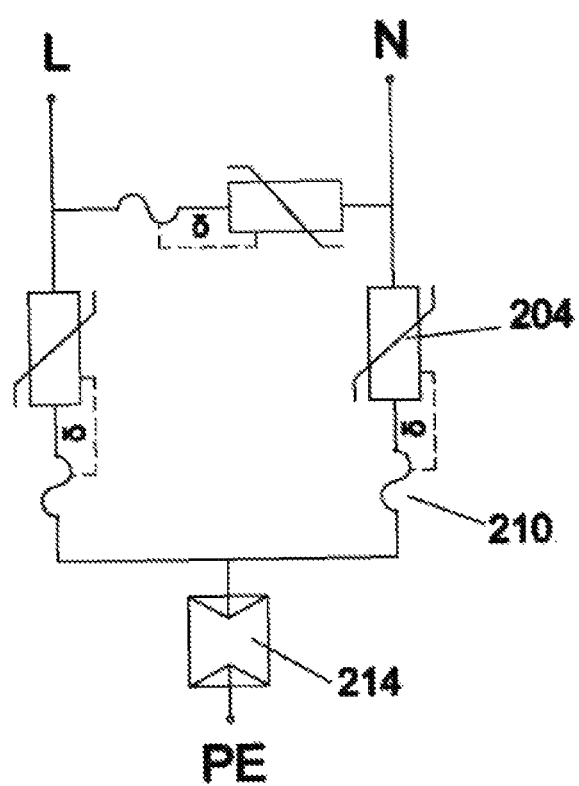
FIG. 2C, FIG. 2D are all-mode protection circuit diagrams of the surge protection unit of the embodiment of the application.
Figure 2D:
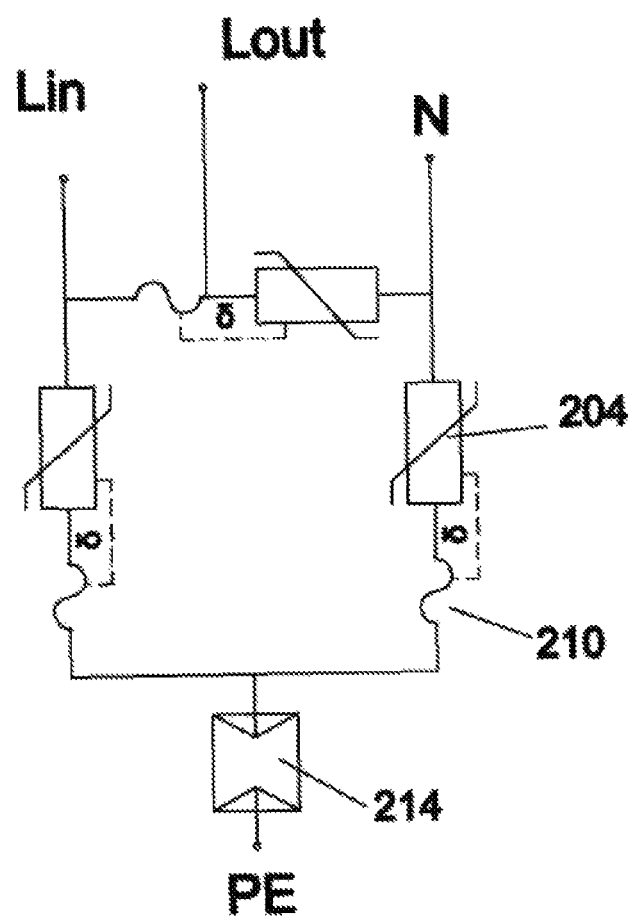

FIG. 2C and FIG. 2D are circuit diagrams of surge protection units 2A and 2B of the embodiment of the application, and the circuit diagrams in FIG. 2C and FIG. 2D can be used both in surge protection units 2A and 2B of the embodiment of the application. As shown in FIG. 2C, the working current of LED street light and photocontrol unit 1 does not go through the thermal protection disconnecting device which between L-N differential mode protection in the surge protection component. The thermal protection disconnecting device is the thermal fuse which between L-N differential mode protection, but the LED streetlights still work even the fuse is disconnected. As shown in FIG. 2D, the working current of LED street lights and photocontrol unit 1 goes through thermal protection disconnecting device of the surge protection component which is between L-N differential mode protection. The thermal protection disconnecting device is the thermal fuse which between L-N differential mode protection. When the thermal fuse disconnects, the LED street light is powered off and stops working.

Embodiment One

FIG. 2A and FIG. 2B are schematic diagrams of the appearance and the structure of the photocontrol with a surge protecting function in Embodiment One of the application. As shown in the figures, photocontrol unit 1, surge protection unit 2A which is built in photocontrol unit 1, and photocontrol base 3 are shown from top to bottom in turn. Surge protection unit 2A is integrated into photocontrol unit 1, being used together with photocontrol base 3, to form a photocontrol with a surge protection function. In the embodiment, existing standard photocontrol unit 1 and existing standard photocontrol base 3 are used, both of which are connected to each other through a socket and a plug, so as to achieve versatility.

Photocontrol unit 1 includes shell 101. PCB plate with photocontrol circuit 102, three sets of electrical connectors 103, bottom cap 104, and plug 105. Details are shown as below: shell 101 is disposed over bottom cap 104. An accommodating space is formed between shell 101 and bottom cap 104. PCB plate with photocontrol circuit 102 is provided in the accommodating space. This PCB plate 102 contains not only the circuit which can achieve photo control function, but also preserves space for surge protection unit 2A. Three sets of electrical connectors 103 are disposed on bottom cap 104. Standard plug 105, which is the first plug, is installed under bottom cap 104. Preferably, first plug 105 is three pieces of metal. The output terminal of PCB plate with photocontrol circuit 102 is connected to the three pieces of metal of plug 105 by three sets of electrical connectors 103 respectively.

Figure 2E:
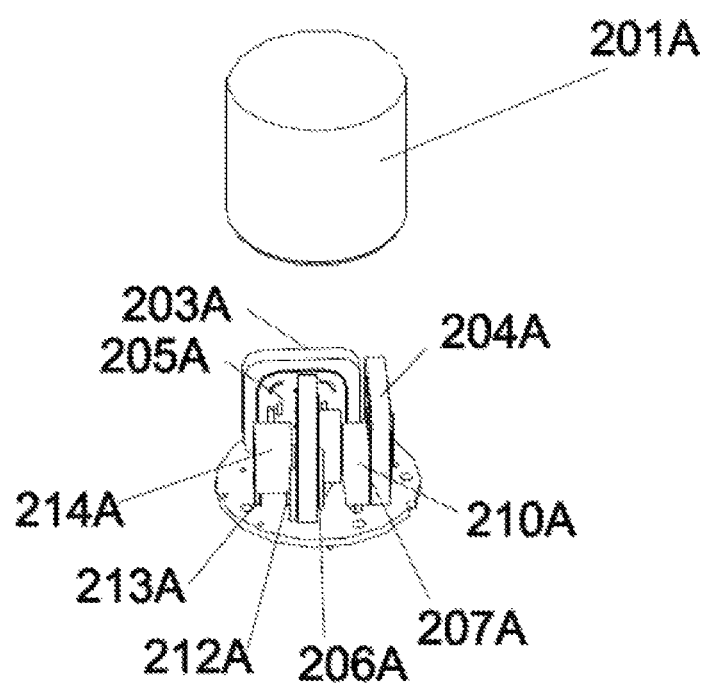
FIG. 2E is a schematic diagram of the structure of the surge protection unit of Embodiment One of the application.

As shown in FIG. 2B, surge protection unit 2A is further disposed inside the accommodating space which is between shell 101 and bottom cap 104 of photocontrol unit 1, more specifically, on PCB plate with photocontrol circuit 102. The phrase line (Lin, Lout) terminal and the neutral line (N) terminal of surge protection unit 2A are connected in parallel to the input terminal of photocontrol unit 1 by printed circuit board (PCB). In Embodiment One, as shown in FIG. 2E, surge protection unit 2A includes cylindrical shell 201A, PCB plate with the photocontrol circuit 102 used together with the photocontrol circuit, and a hermetic chamber formed by cylindrical shell and PCB plate 102. The cylindrical shell is made of engineering plastics which has a flame retardant grade in line with UL94V0 level. The surge protection components inside surge protection unit 2A are electrically insulated from the electric parts on photocontrol unit 1, so as to reduce the volume of the product. Meanwhile, the hermetic chamber is filled with insulating potting material which has a flame retardant grade in line with UL94-V0 level and has a high thermal resistance. Therefore, this surge protection unit 2A can entirely join in photocontrol unit 1 for long-term use.

In Embodiment One, the surge protection circuit of the surge protection unit can be formed with the differential mode alone, the common mode alone, or the all-mode protection manner which has differential mode and common mode simultaneously, as necessary. Typical design of the embodiment can use all-mode protection, which includes three protection components. Each protection component includes a MOV and a thermal protection device that are connected in series. The thermal protection device can be a thermal fuse. A gas discharge tube can be connected in series with the MOV in the common model protection if necessary and is used to insulate the leakage current to the ground in normal operation. In the embodiment, the thermal protection device can cut off the circuit in time when the MOV degrades to failure or undertakes a temporal overvoltage, avoiding a fire in the MOV. The thermal fuse shows one of the many implementations known to the persons skilled in the art, which includes but is not limited to the mechanical tripping manner, the thermal fuse, the low-melting-point alloy or the bimetallic circuit breaker, etc.

In the surge protection unit of Embodiment One, the thermal protection device provided is used as a fail-safe for the MOV protection device, which is implemented using the technology of "a MOV provided with the alloy type of thermal fuse". More specifically, electrodes 205A, 206A, and 207A are welded on the surface of the three MOVs 204A. Three thermal fuses 201A are connected to three MOVs 204A by electrodes 205A, 206A, and 207A through the shortest thermal conductive path effect, forming electrical series respectively, to become the surge protection components. The leads of the three surge protection components are welded on PCB plate 102. Gas discharge tube 214A is connected in series to the surge protection component with common mode protection.

Photocontrol base 3 includes a cylindrical body. Three grooves/holes are arranged in the middle of the body. Three grooves/holes form socket 301 on photocontrol base 3, and are used to match and connect to plug 105 of photocontrol unit 1. At least one hole 304 is provided on the edge of the body along its circumferential direction, and is used for mounting screw 302 to pass through and fasten tightly with mounting nut 303. Mounting screw 302 is used for fixing the photocontrol base, and meanwhile, is connected to the ground by wire. The head of mounting screw 302 can be made into a shape of an electrically contact to form a ground conductor, and form a good electrical connection with ground connector 4. The edge of the head is provided with corners that can form tightened torques. In the embodiment, the number of mounting screw 302 can be set to one or more as necessary. Preferably, two mounting screws 302 are provided symmetrically, but not limited to this.

In the embodiment, when surge protection unit 2A is entirely integrated into photocontrol unit 1, since except for power supply phase line (Lin, Lout) terminal and neutral line (N) terminal, surge protection unit 2A, has to be provided with the around line (PE) terminal, thus, at least one elastic ground connector 4 is provided on bottom cap 104 of photocontrol unit 1, so as to connect to the ground line (PE) of surge protection unit 2A. The position and number of ground connectors 4 should correspond to those of mounting screws 302. The number of the ground connectors can be set according to actual needs, such as one or more. In the preferred embodiment, two mounting screws 302 are provided symmetrically, but not limited to this.

Figure 3:
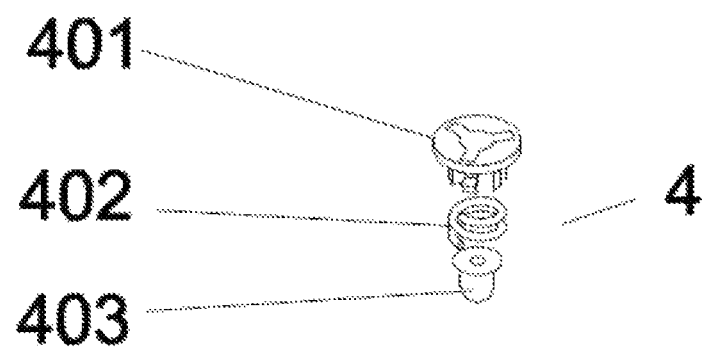
FIG. 3 is a schematic diagram of the structure of the ground connector of the application.

The specific structure of ground connector 4, referring to FIG. 3 includes to ground connector lock cover 401, elastic member 402, ground connector push rod 403 in sequentially contacting connection. In the application, elastic member 402 can be any spring which may be used in the art, such as tension springs, compression springs, torsion springs, bending springs, and etc., and also can be elements that are made of other elastic materials. Three parts of ground connector 4, ground connector push rod 403, elastic member 402, and ground connector lock cover 401 are enclosed in corresponding mounting through holes 106 on bottom cap 104 in order.

In use, plug 105 of photocontrol unit 1 with surge protection unit 2A is aligned with the socket 301 of photocontrol base 3, and is pressed down so that plug 105 is inserted into socket 301 normally, such that the photocontrol circuit 102 in photocontrol unit 1 is on, and thus encompasses the photo control function in a conventional sense. Once plug 105 is installed, at the same time, the end of ground connector push rod 403 of around connector 4 forms a good electrical connection to the head of mounting screw 302 of photocontrol base 3 by the elastic force of spring. Therefore, the ground line (PE) terminal of surge protection unit 2A is connected with the ground by ground connector 4 and mounting screw 302. When the surge occurs, the surge will be conducted into the ground by the wire connecting to mounting screws 302, so as to form the surge protection, having the surge protection function.

In Embodiment One, without changing traditional photocontrol function, the surge protection unit is added to the standard photocontrol unit, and ground connector is also added to achieve the connection between the ground line (PE) terminal of the surge protection unit and the ground, forming a surge current discharge path to the ground, creating the photocontrol with the full-mode surge protection function described in the application. Since the surge protection unit is entirely integrated into the photocontrol unit, functions of both are combined, but the installation method of the photocontrol is not changed. Therefore, the photocontrol with a surge protection function in the application can be the same as an ordinary photocontrol, that is, can be directly installed outside the lamp using a quick plug-in installation manner. As such, it does not need to cut off the power supply when replacing. Only one person is needed to operate. The time and labor are saved. Especially, in high labor cost countries like Europe and America, the post-maintenance cost is greatly reduced, and the operational safety of the staff is improved.

Embodiment Two

Since surge protection unit 2A is entirely integrated into photocontrol unit 1 in Embodiment One, the entire assembly must be replaced when any part of the photocontrol or the surge protection unit is damaged. If only the surge protection unit needs to be replaced because of deterioration caused by continuous attacks of the surge or damage caused by temporary overvoltage, there is no need to replace the photocontrol together at this time, so as to reduce waste. To solve these problems, the application also provides a second type of embodiment.

Figure 4A:
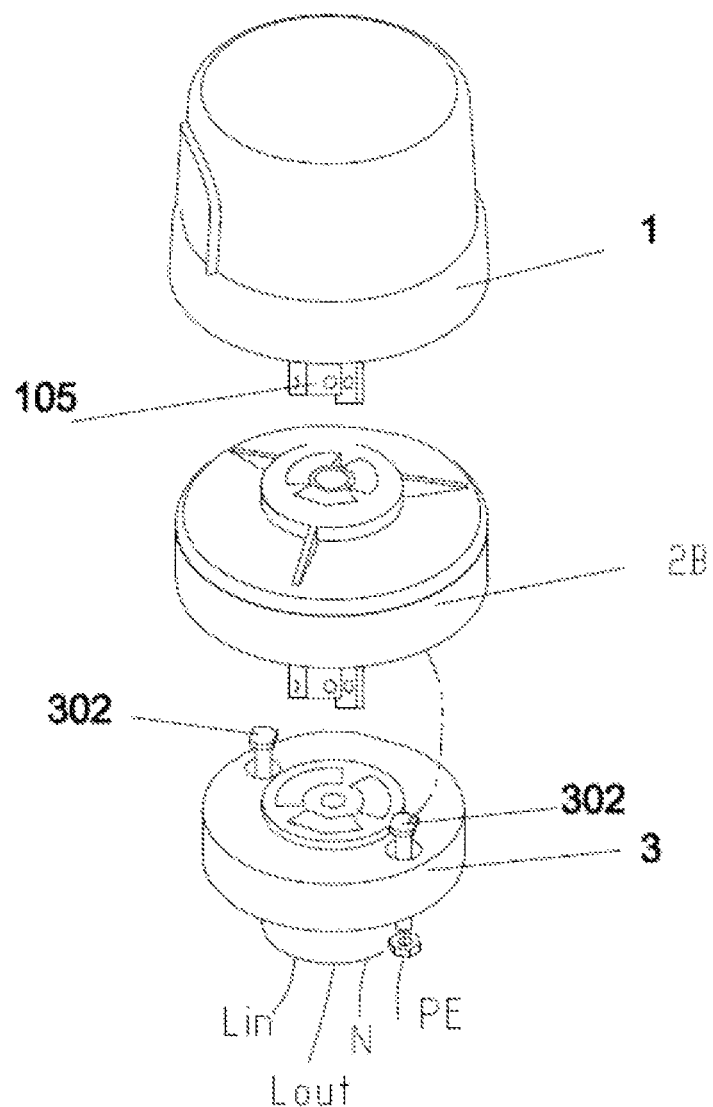
FIG. 4A is a schematic diagram of the appearance of Embodiment Two of the application.
Figure 4B:
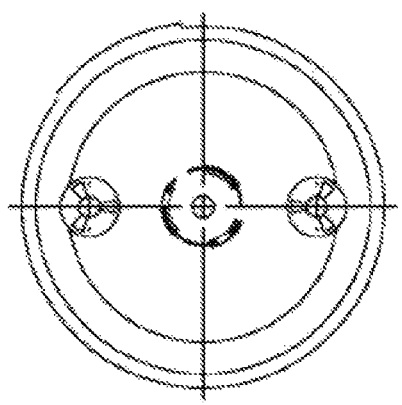
FIG. 4B is a top view of Embodiment Two of the application.

FIG. 4A and FIG. 4B show the appearance schematic diagram and the top view of the photocontrol with surge protection in Embodiment Two. As shown in the figures, photocontrol unit 1, surge protection unit 2B, and photocontrol base 3 are shown from top to bottom in turn. The internal structure and function of photocontrol unit 1 and photocontrol base 3 are the same as those described in Embodiment One. However, in Embodiment Two, surge protection unit 2B is not integrated into photocontrol unit 1, but is connected to photocontrol unit 1 and photocontrol base 3 respectively by a connector which is provided on the surge protection unit. These three parts form a three-layer laminated structure by the combination of plug and socket. Photocontrol unit 1 and base 3 can use the standard photocontrol assemblies commonly used in the art.

Figure 5:
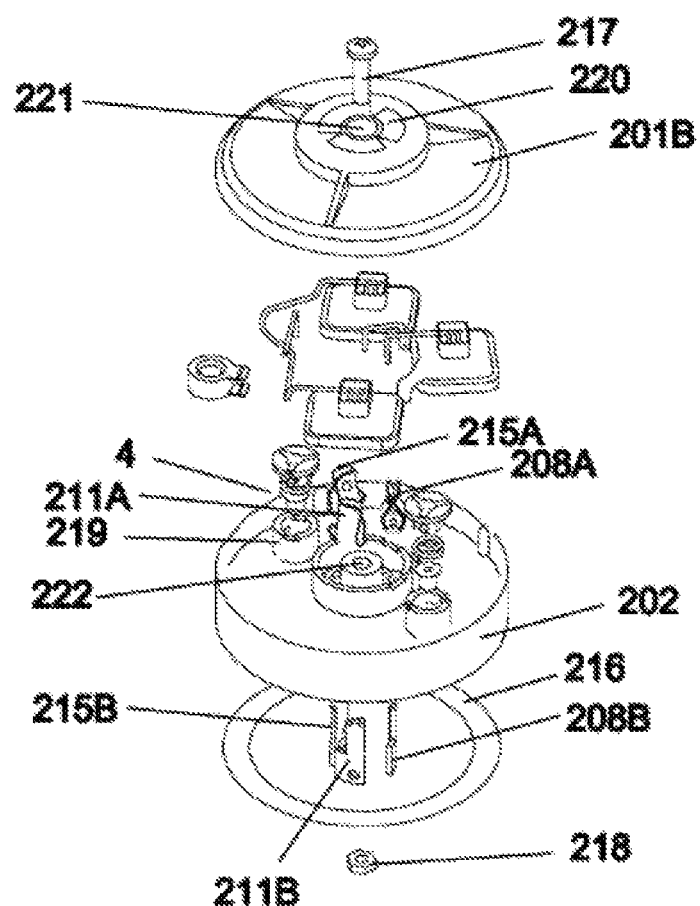
FIG. 5 is an internal structural diagram of the surge protection unit of Embodiment Two of the application.

FIG. 5 shows the internal structure of the surge protection unit 2B in Embodiment Two. As shown in FIG. 5 surge protection unit 2B includes upper cover 201B lower cover 202, and surge protection component disposed inside the hermetic space which is between upper cover 201B and lower cover 202. In order to ensure insulation requirements, upper cover 201B and lower cover 202 can be made of engineering plastics material which meets the flame retardant grade in line with UL94V0 level. Insulation potting material which meets the flame retardant grade in line with UL94V0 level and has a high thermal resistance can also be used to fill between the upper cover and the lower cover, so as to achieve an insulating effect. In use, upper cover 201B and lower cover 202 match and are fixed to form a whole. As shown in the figure, the shape of the whole is a pie, but not limited to this. It can be formed into any shape as necessary. Furthermore, upper cover 201B and lower cover 202 can be fixedly connected using any manner known by persons skilled in the. For example, detachable manners such as projection, groove, internal or external thread, and etc. can be provided on the upper cover and the lower cover to form the connection. Otherwise, non-detachable manner such ad bonding, riveting, welding, and etc. can be used to form the connection, but not limited to this.

In Embodiment Two, upper cover 201B and lower cover 202 are connected by means of screws and nuts. Specifically, center holes 221, 222 are arranged in the central region of the upper cover 201B and lower cover 202. The screw 217 passes through center hole 221 of the upper cover and center hole 222 of the lower center, with nut 218 being used at the bottom of lower cover 202 for fastening. Furthermore, waterproof pad 216 can also be provided for further sealing. Three through holes 220 are farther provided inside upper cover 201B. The sector regions shown in FIG. 5 are through holes 220. The three through holes correspond to three metal pieces on plug 105 of photocontrol unit 1, such that plug 105 can be inserted into socket 220 to connect to the connector of surge protection unit 2B. Three electrical connectors 208, 211, 215 are provided inside lower cover 202, including connector for incoming line terminal (Lin) 208, connector of load terminal (Lout) 211 and connector of neutral line terminal (N) 215. The structures of the three electrical connectors 208, 211, 215 are similar, and their shapes are basically the same. However, in order to prevent L, N terminals misconnection, the plug size of one of the connectors (such as N-terminal) can be set slightly larger. For example, the electrical connector for incoming line terminal "Lin" 208, as shown in FIG. 5, one terminal of the connector for incoming line terminal "Lin" 208 is a female socket 208A which is made by bending an elastic metal sheet. This female socket 208A correspondingly receives plug 105 which inserts from through hole 220, so as to achieve the connection between photocontrol unit 1 and surge protection unit 2. While another opposite terminal of electrical connector 208 is male plug 208B which extends downwards from lower cover 202. This male plug 208B is exactly the same as plug 105, and is used to insert into socket 301 of photocontrol base 3, so as to achieve the connection between surge protection unit 2B and photocontrol base 3. Furthermore, the female socket 208A and male plug 208B are joined by welding or riveting, or can be formed integrally if necessary.

Embodiment Two is also provided with two symmetrical elastic ground connectors 4 for connecting the ground line (PE) terminal of surge protection unit 2B. The structure and number of ground connectors 4 are the same as in those in Embodiment One, referring to FIG. 3. In Embodiment Two, the differences from Embodiment One are that ground connector push rod 403, elastic member 402, ground connector lock cover 401 are enclosed sequentially into respective mounting through holes 219 that are located lower cover 202, as shown in FIG. 5.

In Embodiment Two, the surge protection circuit also includes three surge protection components. Each surge protection component includes a MOV and a thermal protection device that are connected in series. The surge protection component can be formed with the differential mode alone, the common mode alone, or the all-mode manner which has the differential mode and the common mode simultaneously, as necessary. A gas discharge tube can be connected in series with the MOV in the common model protection as necessary, and used to insulate the leakage current to the ground in normal operation. In the embodiment, the thermal protection device is thermal protection disconnecting device, i.e., thermal fuse 210B. The thermal protection disconnecting device can also be implemented by any manner known by person skilled person in the art, including but not limited to: mechanical tripping, thermal fuse, low-melting-point alloy or bimetallic circuit breaker, etc. The thermal protection device is a mechanical thermal desorption device, thermal fuse, low-melting point alloy disconnect device, bimetal thermal circuit breaker or current fuse, or a combination in series of any number of the above.

Figure 6:
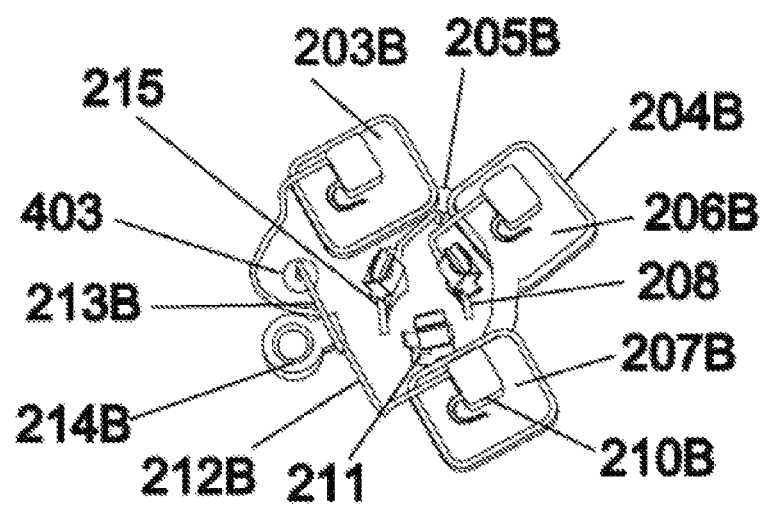
FIG. 6 is a schematic diagram of physical connections of the surge protection unit of Embodiment Two of the application.

FIG. 6 shows a physical connection diagram of surge protection unit 2B in FIG. 5 in detail. As shown in FIG. 6, three surge protection components and discharge tubes are placed in the hermetic space between upper cover 201B and lower cover 202 in a tiled manner. The surge protect circuit includes first electrode 203, three pieces of MOVs 204B, second electrode 205B, third electrode 206B, fourth electrode 207B, three thermal protection disconnecting device i.e., thermal fuse 210B input electrode connecting line of discharge tube 212B, output terminal connecting line of discharge tube 213B, and discharge tube 214B. Three pieces of MOVs 204B are respectively welded between first electrode 203B and second electrode 205B, between second electrode 205B and third electrode 206B, between fourth electrode 207B and third electrode 206B. Three thermal protection disconnecting devices, i.e., thermal fuses 210B are respectively provided on first electrode 203B, third electrode 206B, and fourth electrode 207B. One terminal of each thermal protection disconnecting device (i.e., thermal fuse 210B) is electrically connected to its corresponding electrode. Second electrode 205B is electrically connected to connector 215 of neutral line terminal 'N'. The other terminal of the thermal protection disconnecting device (i.e., thermal fuse 210B) protection device on the third electrode 206B is electrically connected to connector of incoming line terminal 'Lin' 208. Input electrode connecting line of discharge tube 212B is electrically connected to the other terminal of thermal protection disconnecting device (i.e., thermal fuse 210B) on first electrode 203B, the other terminal of thermal protection disconnecting device (i.e., thermal fuse 210) protection device on fourth electrode 207B, and one terminal of discharge tube 214B respectively. Output electrode connecting line of discharge tube 213B is electrically connected to the other terminal of the discharge tube 214B and ground connector push rod 403.

In use, plug 105 of photocontrol unit 1 is aligned with three through holes 220 on upper cover 201B of surge protection unit 2B, and is pressed down, so that plug 105 passes through holes 220, and inserts into female socket terminals such as 208A of three electrical connectors 208, 211, 215 respectively, to form a good connection. After plug 105 of photocontrol unit 1 is installed, male plug terminal (such as 208B) of connector 208, 211, and 215, which extends under lower cover 202 of surge protection unit 2B is aligned with socket 301 of photocontrol base 3, and is pressed down, so that male plug is connected normally to socket 301, such that the photocontrol circuit 102 in photocontrol unit 1 is on, and thus has the photocontrol function in conventional sense. At the same time, the end of push rod 403 of ground connector 4 contacts the head of mounting screw 302 on photocontrol base 3 by the elastic force of elastic member 402, to form a good electrical connection. Thus, the ground line (PE) terminal of surge protection unit 2B conducts to ground through ground connector 4 and mounting screw 302. When the surge occurs, it will be conducted into the ground by the wire connected to mounting screws 302, to form the function of full-mode surge protection device.

Embodiment Two does not change the function of the traditional photocontrol, and does not make any change to the structure of the photocontrol either. It is only required to ensure the locking screw on the photocontrol has good conductive properties and connects to the ground. The surge protection unit is added between the existing photocontrol unit and the photocontrol base. Also, through plug-in electrical connectors provided on the surge protection unit and ground connectors, the surge protection function is achieved, thus facilitating easy installation and flexible replacement of the photocontrol and the surge protection unit. In addition to the advantages of quick plug-in and direct installation it also provides an advantage that the photocontrol unit and the surge protection unit cannot be replaced separately. Through different electrical connections inside the surge protection unit, protection requirements of the common mode, the differential mode, and the all-mode in the LED lighting power supply system are achieved.

For persons skilled in the art, it is easy to conceive of many modifications and other embodiments of the application. The contents of descriptions above and the associated drawings in the application have a useful technical motivation. Thus, the present application is not limited to specific embodiments disclosed here, but also includes various modifications and other embodiments within the scope of the claims. Although in the context, certain specific terms are used, they are only used for a general and descriptive sense, and do not constitute a limitation.

The invention claimed is:

1. A photocontrol with a surge protecting function, comprising: a photocontrol unit, a surge protection unit, and a photocontrol base;
   wherein the photocontrol unit includes a plug; the photocontrol base includes a socket corresponding to the plug;
   wherein the photocontrol unit is connected to the surge protection unit to form a whole, the formed whole being connected to the photocontrol base;
   wherein the surge protection unit is connected in parallel to a phase line terminal and a neutral line terminal of the photocontrol unit, a ground line terminal of the surge protection unit being connected to a conductive part on the photocontrol base by at least a ground connector, the conductive part being connected to ground;
   wherein the ground connector includes a lock cover, a spring, and a ground connector push rod that are sequentially connected;
   wherein the conductive part on the photocontrol base is a mounting screw; and
   wherein the push rod of the ground connector is connected to the head of the mounting screw in a contact manner.

2. A photocontrol with a surge protecting function, comprising: a photocontrol unit, a surge protection unit, and a photocontrol base;
   wherein the photocontrol unit includes a plug; the photocontrol base includes a socket corresponding to the plug;
   wherein the photocontrol unit is connected to the surge protection unit to form a whole, the formed whole being connected to the photocontrol base;
   wherein the surge protection unit is connected in parallel to a phase line terminal and a neutral line terminal of the photocontrol unit, a ground line terminal of the surge protection unit being connected to a conductive part on the photocontrol base by at least a ground connector, the conductive part being connected to ground;
   wherein the surge protection unit is located between the photocontrol unit and the photocontrol base, the surge protection unit being connected to the photocontrol unit by a connector provided on the surge protection unit;
   wherein the connector includes a female socket terminal and a male plug terminal, wherein when being installed, the plug terminal of the photocontrol unit is inserted into the female socket terminal of the connector of the surge protection unit, and the male plug terminal of the connector of the surge protection unit is inserted into a socket of the photocontrol base.

* * * * *